United States Patent [19]

Kuranishi et al.

[11] 4,438,328
[45] Mar. 20, 1984

[54] CARD READER FOR READING INFORMATION CARRIED ON TAG CARDS

[75] Inventors: Masaaki Kuranishi; Yasuhiko Togo, both of Yamatokoriyama, Japan

[73] Assignee: Sharp Kabushiki Kaisha, Osaka, Japan

[21] Appl. No.: 304,156

[22] Filed: Sep. 21, 1981

[30] Foreign Application Priority Data

Sep. 25, 1980 [JP] Japan .................................. 55-134910

[51] Int. Cl.³ .............................................. H01M 1/48
[52] U.S. Cl. .................................... 235/181; 235/175; 235/482; 235/483; 209/583
[58] Field of Search ............... 235/481, 475, 482, 483; 209/583, 539, 569

[56] References Cited

U.S. PATENT DOCUMENTS

| | | | |
|---|---|---|---|
| 3,592,972 | 7/1971 | Lane | 235/481 |
| 3,594,549 | 7/1971 | Frank | 235/481 |
| 3,750,880 | 8/1973 | Petrovsky et al. | 209/539 |

FOREIGN PATENT DOCUMENTS

| | | | |
|---|---|---|---|
| 1202549 | 10/1965 | Fed. Rep. of Germany | 235/481 |
| 2118543 | 4/1971 | Fed. Rep. of Germany | 235/482 |

OTHER PUBLICATIONS

IBM Technical Disclosure Bulletin, vol. 9, No. 12, 5/67, p. 1760.

*Primary Examiner*—G. Z. Rubinson
*Assistant Examiner*—Robert Lev
*Attorney, Agent, or Firm*—Birch, Stewart, Kolasch & Birch

[57] ABSTRACT

A card reading assembly includes a drive for driving a card carrying recordings on one or more entry regions thereon along the course of travel typically due to the force of gravity on the card. A plurality of stops force the card to a temporary stop during the course of its travel and a pickup head disposed in the course of travel of said card scans said entry regions of the card arrested by the stops for reading the recordings on the entry regions.

9 Claims, 10 Drawing Figures

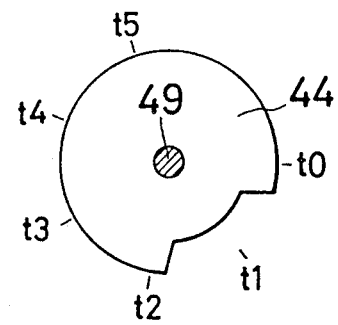
FIG.6 (1)
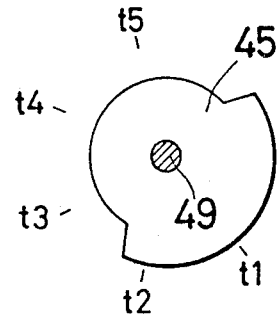
FIG.6 (2)
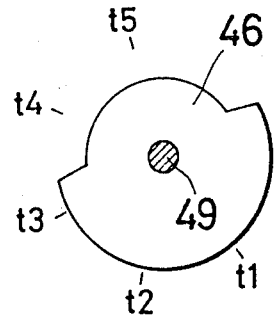
FIG.6 (3)
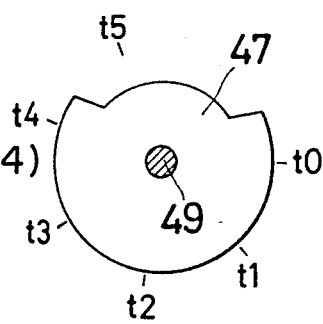
FIG.6 (4)
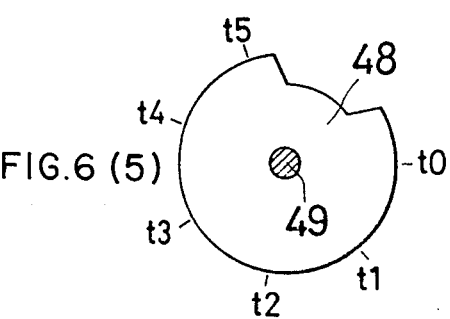
FIG.6 (5)
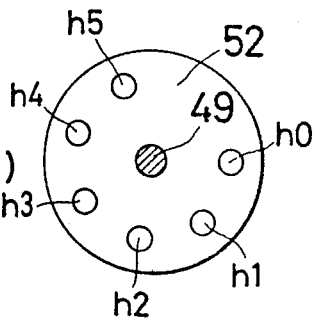
FIG.6 (6)

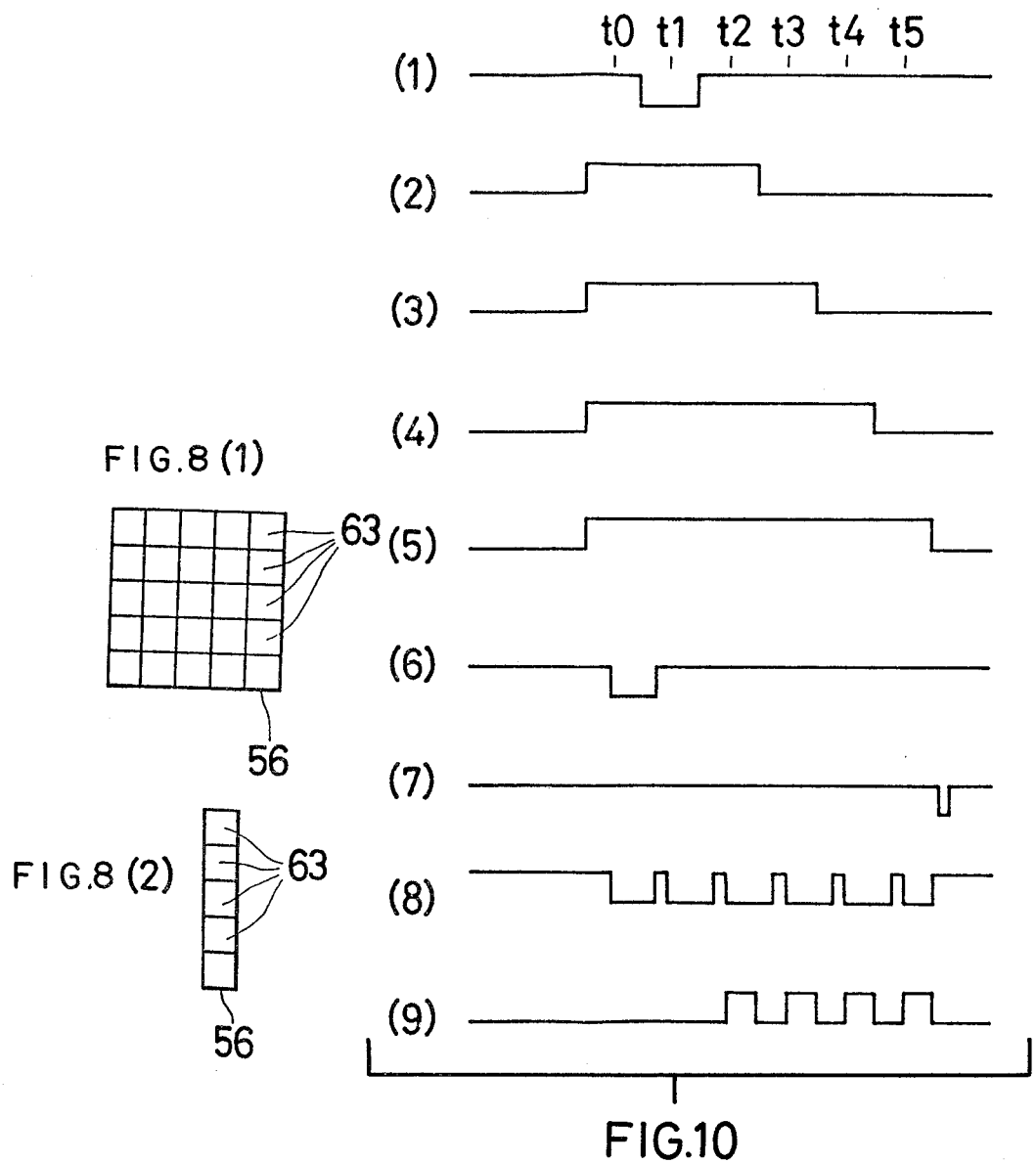

_CARD READER FOR READING INFORMATION CARRIED ON TAG CARDS_

BACKGROUND OF THE INVENTION

This invention relates to a readout assembly for reading information recorded on a card for use in a so-called OCR (optical character reader) or the like or bar-coded recordings on a tag card.

It has been well known that sales clerks use a hand scanner to scan information recorded on tag cards attached to items for to facilitate reading of information. Therefore, reading of those recordings demands labor- and time-consuming work.

OBJECT AND SUMMARY OF THE INVENTION

Accordingly, it is an object of the present invention to provide a card reader which permits automatic reading of information recorded on entry regions of a card. To achieve the above described objective, the present invention provides a card reading assembly which comprises means for driving a card carrying recordings on its storage region along the course of its travel, means for forcing said card to a temporary stop during the course of its travel, and reading means disposed adjacent the course of travel of said card in such a manner as to be exposed to said storage region of said card arrested by said stop means for reading the recordings on said storage region.

BRIEF DESCRIPTION OF THE DRAWINGS

For a more complete understanding of the present invention and for further objects and advantages thereof, reference is now made to the following description taken in conjunction with the accompanying drawings, in which:

FIG. 6 is a plan view showing an array of cams 44 to 48 and a timing plate 52;

FIG. 8 is a front view of readout cells in a pickup head 56;

FIG. 10 is a waveform diagram for explanation of operation of the reader assembly as illustrated in FIG. 9.

DETAILED DESCRIPTION OF THE INVENTION

Figure 1:
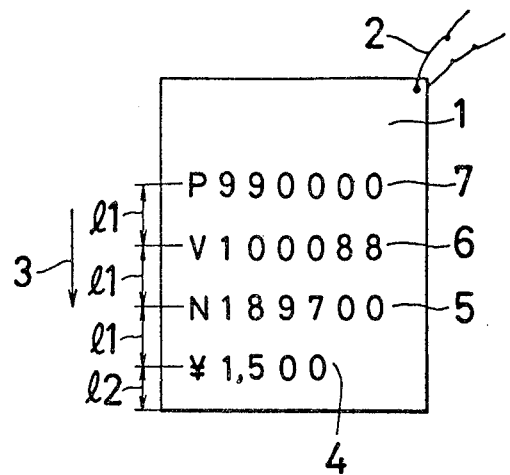
FIG. 1 is a front view of a card which can be read by a reader assembly according to the present invention.

FIG. 1 is a front view of a card 1 which is to be processed through a card reader assembly according to the present invention. As is well known in the art, the card 1 which is attached to an item with a string 2 or the like serves as a tag card or a price card. Formed at a surface of the card 1 are a plurality of entry regions 4 to 7 which are aligned along the direction of the arrow 3. The respective entry regions 4 to 7 extend in a direction normal to the direction of travel of the card 1 (cross direction in FIG. 1). These entry regions 4 to 7 carry recordings of unit prices of individual items, section (buyers, dealers, etc.,) codes, items identifying codes and so forth. This card 1 may be made up pursuant to the Japanese Industrial Standard. The lowest entry region 4 is located at a distance $l_2$ away the bottom edge of the card 1. Preferably, the entry regions 4 to 7 are equal spaced along the direction 3 of travel and especially at an interval $l_1$ in the illustrated embodiment.

Figure 2:
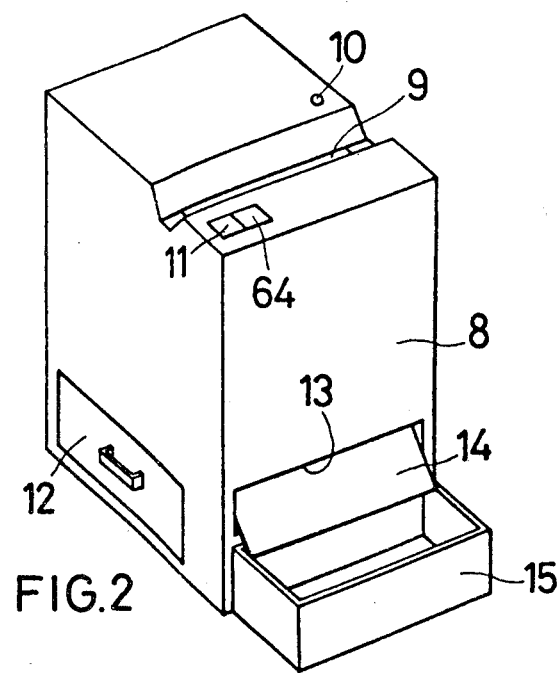
FIG. 2 is a perspective view of the reader assembly according to an embodiment of the present invention.

FIG. 2 shows a perspective view of the card reader assembly adapted for reading the recordings on the entry regions 4 to 7 of the card 1 of FIG. 1. An inlet opening 9 is formed at an upper portion of a casing 8 for insertion of the card 1. At the upper portion of the casing there is further provided an indication lamp 10 for indicating that the assembly is on standby to read the card 1, together with a lamp 11 for indicating faulty reading of the card 1. Have being read normally without the detection of a fault condition, the card 1 introduced via the inlet opening 9 is led down to a drawer-like stacker 12 which is removably installed in the casing 8. In the case of a fault condition, the card 1 is delivered via a guide plate 14 from an outlet opening 13 formed at a forward portion of the casing 8. Furthermore, installed at the forward portion of the casing 8 is a second stacker 15 for receiving the card 1 in the event of the fault condition. Upon actuation of a button 64 the assembly can be reset to remove the fault condition.

Figure 3:
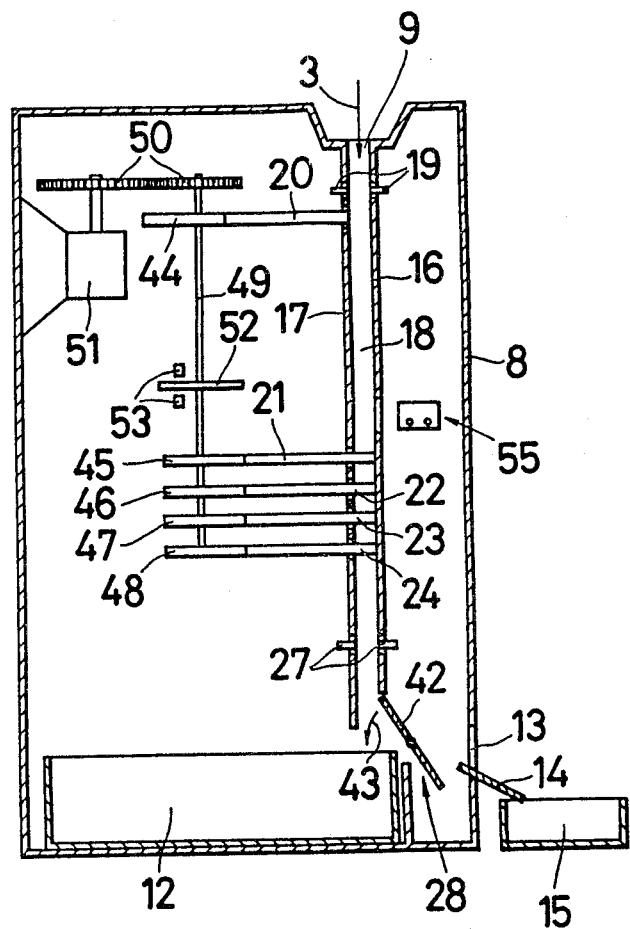
FIG. 3 is a simplified longitudinal cross sectional view of the reader assembly.

FIG. 3 shows in longitudinal cross section the card reader assembly shown in FIG. 2. The course 18 of travel of the card 1 is defined in a vertical direction within the casing 8 by means of a pair of vertically aligned parallel guide plates 16 and 17, with the upper end thereof being in communication with the inlet opening 9. There is disposed in the travel course 18 from top to bottom a card sensor 19, a first stop 20, a second stop 21, a third stop 22, a fourth stop 23, a fifth stop 24, a card sensor 27 and a separator 28 in the named order. Card sensor 19 comprises a light emitting element and a light receiving element both of which are opposed to each other with the intervention of the travel course 18. The card passing through the travel course 18 blocks up light emerging from the light emitting element which is about to reach the light receiving element. The card sensor 27 is made up in a manner similar to the card sensor 19.

Figure 4:
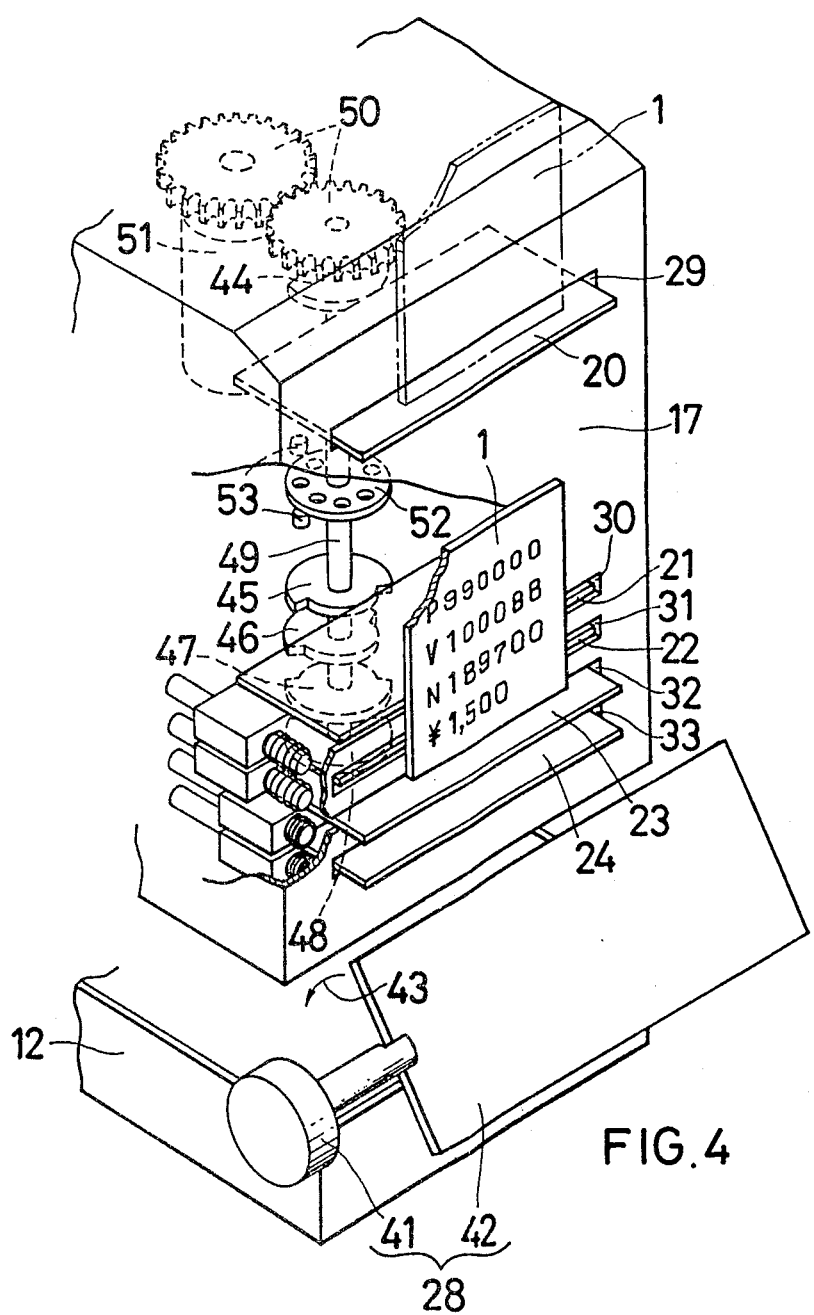
FIG. 4 is a perspective view showing the internal construction of the reader assembly in more detail.

The first through fifth stops 20–24, the separator 28, etc., are shown in a simplified form in FIG. 4. The guide plate 17 is formed with openings 29–33 which permit the first through fifth stops 20–24 to be exposed to the travel course 18. The first through fifth stops 20–24 within the travel course 18 are movable forwardly and backwardly in a direction normal to the direction 3 of travel of the card 1. A readout station 55 is disposed halfway between the first and second stops 20 and 21 so that it may be exposed to the travel course 18. The card sensor 19 is adapted to sense the card 1 arrested by the first stop 20.

Figure 5:
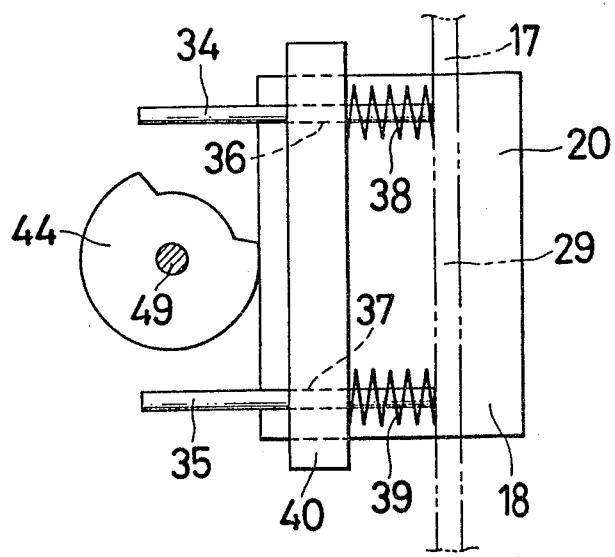
FIG. 5 is a bottom view showing a first stop 20.

FIG. 5 is a bottom view of the first stop 20 and its peripheral components while being viewed from bottom. A pair of guide rods 34 and 35 spaced apart along the width of the travel course 18 (that is, a vertical direction in FIG. 5 and a direction normal to the plane including the sheet of FIG. 3) are juxtaposed in a horizontal direction and affixed to the surface of the guide plate 17 opposite the travel course 18. The guide rods 34 and 35 are snugly received within guide slots 36 and 37 in a mounting 40 seated on the bottom of the first stop 20. The first stop 20 is biased with springs 38 and 39 in a direction of being remote from the travel course 18 (left in FIGS. 3 and 5). The remaining second through fifth stops 21-24 are designed in a manner similar to the first stop 20. In FIG. 4, the guide rods 34 and 35, the mounting 40 and the springs 38 and 39 are eliminated and some of the peripheral components associated with the second through fifth stops 21-24 are shown in a simplified form, for the convenience of illustration only.

The separator 28 disposed at the lowest end of the travel course 18 consists of a rotary solenoid 41 and a separation plate 42. When the rotary solenoid 41 is in non-energized state, the separation plate 42 stands in the position as depicted in FIGS. 3 and 4 so that the card 1 dropping off the travel course 18 may plunge into the stacker 12. If the rotary solenoid 41 is energized, then the separation plate 42 makes an angular displacement in the direction of the arrow 43, extending into the travel course 18. The result is that the card 1 is conveyed from the travel course 18 into the stacker 15 via the guide plate 14.

To shift the first through fifth stops 20-24 forwardly and backwardly in relation to the travel course 18, working surfaces of cams 44-48 are brought into contact with the edge surfaces of the first through fifth stops 20-24 which are opposite to the travel course 18. Each of the cams 44-48 is of a plate-like structure which is drivingly fixed on a common driving shaft 49 driven by a motor 51 via a gearing 50. The working surfaces of the respective cams 44-48 are shown in FIGS. 6(1) to 6(5). A timing plate 52 having a plurality of perforations $h_0$-$h_5$ spaced in the circumferential direction is also affixed to the driving shaft 49. The passage of these perforations $h_0$-$h_5$ is monitored through a timing sensor 53 comprising in combination a well known light emitting element and a well known light receiving element. Each of the perforations corresponds to a respective one of actuating positions $t_0$-$t_5$ about the driving shaft 49 for the cams 44-48. The profiles of the cams 44-48 will be described with reference to FIG. 10.

Figure 7:
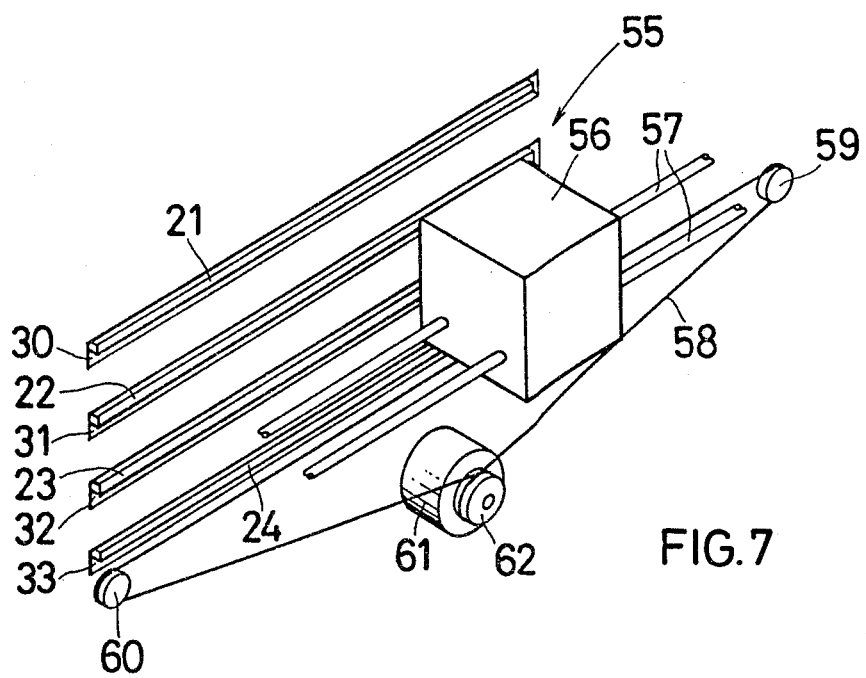
FIG. 7 is a perspective view showing the scheme of a reading station 55.

FIG. 7 is a perspective view showing the readout station 55 in a simplified form. The readout station 55 has a pickup head 56 for reading the recordings on the entry regions 4-7 of the card 1. It is noted that the pickup head 56 is movable in a direction parallel with the width of the travel course 18 (i.e., normal to the plane including the sheet of FIG. 3) and normal to the direction 3 of travel while being guided by means of a pair of guide rods 57. The opposing ends of a wire 58 are tied like an endless belt to the pickup head 56. The wire 58 is wound about a driving pulley 62 reversibly driven by a motor 62, extending between a pair of pulleys 59 and 60. The pickup head 56 is disposed within the travel course 18 in the direction 18 of travel so that it may read the recordings on the lowest entry region 4 when the card 1 is stationary with the lowest end thereof being held by the second stop 21. The positions of the third through fifth stops 22-24 within the travel course 18 are selected in such a manner that the pickup head 56 comes into operative relationship with the entry regions 5-7, respectively, when the card 1 is forced into a temporary stop with the third through fifth stops 22-24.

FIG. 8(1) shows the front face of the pickup head 56 directed toward the card 1. The pickup head 56 includes a predetermined number of lattice-like readout cells 63 aligned to be exposed to the surface of the card 1 having the entry regions 4-7. With the readout cells illustrated herein, it is possible to read at one time the recordings of a character length as contained in the entry regions. An alternative form of the pickup head 56 is shown in FIG. 8(2), which includes only one array of readout cells 63 in the direction 3 of travel, the length of the array being generally equal to the height of the entry regions 4-7.

As is well known in the art, the readout cells 63 are of a design that reads a character by means of reflected light from the entry regions 4-7 of the card 1 when the entry regions 4-7 of the card 1 is illuminated with light.

Figure 9:
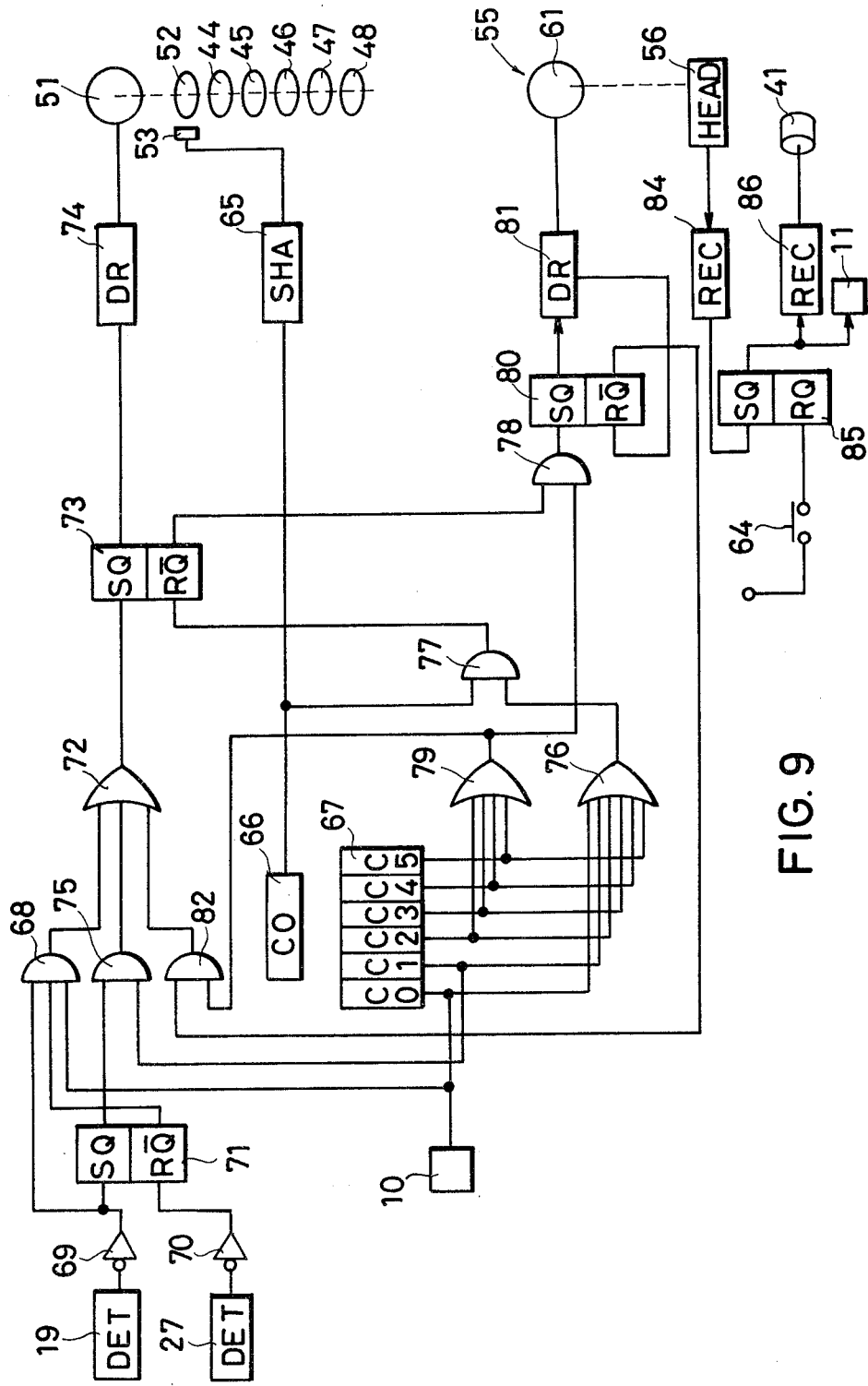
FIG. 9 is a block diagram of the reader assembly.

FIG. 9 is a block diagram of the card reader assembly according to the present invention. Under the standby state where no card 1 is inserted via the inlet opening 9, the timing sensor 53 senses the position of the perforation $h_0$ in the timing plate 52. At this time the cams 44-48 are in the actuating position $t_0$ where the respective cams 44-48 hold the first through fifth stops 20-24 extending into the travel course 18 and prevent the card 1 from moving along the course 18 of its travel.

FIG. 10 is a waveform chart for explanation of operation of the arrangement of FIG. 9, wherein FIGS. 10(1) through 10(5) depict lifts of the first through fifth stops 20-24. These lifts at a high level indicate that the first through fifth stops 20-24 extend into the travel course 18. With the lifts at a low level, the first through fifth stops are in retracted position with regard to the travel course 18 so that the card 1 can drop in the direction 3 of travel due to its gravity.

When the cams 44-48 are in the actuating position $t_0$, the output of the timing sensor 53 is fed to a counter 66 by way of a waveform shaping circuit 65. The counter 66 varies in its count by one in response to a leading edge of the output of the waveform shaping circuit 65 each time any one of the perforations $h_0$-$h_5$. A decoder 67 receives the output of the counter 66 and feeds logic "1" signals sequentially from output terminals $C_0$-$C_5$. Each of the output terminals $C_0$-$C_5$ corresponds to a respective one of the perforations $h_0$-$h_5$, i.e., the actuating positions $t_0$-$t_5$. In other words, the logic "1" signal is delivered from one of the output terminals $C_0$-$C_5$ which corresponds to any one of the actuating positions $t_0$-$t_5$ of the cams in which the first through fifth stops 20-24 are in contact. With the output terminal $C_0$ provides the logic "1" signal, the assembly is on standby to read with the travel course 18 being closed by the first stop 20. It is when the logic "1" signal is supplied from the output terminal $C_1$ that the first stop 20 moves backwardly of the travel course 18 and the card 1 drops off and comes to a stop due to the second stop 21. When the logic "1" signal is delivered from the output terminals $C_2$ through $C_5$, the card 1 is prohibited from moving due to the second through fifth stops 21-24, respectively, so that the entry regions 4-7 are in readable state by means of the readout station 55. The indication lamp 10 is fired with the logic "1" signal supplied from the output terminal $C_0$.

In the standby state of the reader assembly, the timing sensor 53 senses the perforation $h_0$. Since the first through fifth stops 20-24 are in contact with the actuating position $t_0$ of the cams 44-48, the output terminal $C_0$ of the decoder 67 provides the logic "1" signal whereas the remaining output terminals $C_1$-$C_5$ provide logic "0" signals. The logic "1" output from the terminal $C_0$ is fed to an AND gate 68.

If the card 1 is inserted via the inlet port 9 under these circumstances, then the card 1 is arrested by the first stop 20. The card sensor 19 senses this card and provides its output or "0" signal as shown in FIG. 10(6).

The output of the card sensor 19 is reversed via an inverter 69, with the leading edge thereof being fed to the AND gate 68. The output signal of FIG. 10(7) is supplied via an inverter 70 to a flip flop 71 to reset the same if a previous card 1 has already been sensed by the card sensor 27. Accordingly, the reset output Q thereof is logic "1" and applied to the AND gate 68. By sensing the card 1 via the inlet port 9 with the card sensor 19, the output from the AND gate 68 is fed via an OR gate 72 to a flip flop 73, thereby setting the flip flop 73. The set output Q of the flip flop 73 is fed to a motor drive 74 to drive the motor 51 and rotate the driving shaft 49. The waveform of the set output Q of the flip flop 73 is illustrated in FIG. 10(8).

Upon rotation of the motor 51 the cams 44–48 rotates with the timing plate 52. When the timing sensor 53 senses the perforation $h_1$ in the timing plate 52, its output is fed via the waveform shaping circuit 65 to the counter 66 which in turn commences counting in response to the leading edge of the output from the waveform shaping circuit 65. The decoder 67 delivers the logic "1" signal from the output terminal $C_1$ and the logic "0" signal from the remaining output terminals $C_0$ and $C_2$–$C_5$. The logic "1" signal from the output terminal $C_1$ is fed via the OR gate 76 to the AND gate 77 which also receives a pulse from the waveform shaping circuit 65. The result is that the output from the AND gate 77 places the flip flop 73 into reset state. The motor drive 74 therefore discontinues rotating the motor 51. As soon as the actuating position $t_0$ of the cam 44 comes into contact with the first stop 20, the first stop 20 moves out of the travel course 18. For this reason the card 1 falls down in the direction B of travel along the travel course 18. The second stop 21 is in contact with the actuating position $t_1$ of the cam 45 and extends into the travel course 18. The card 1 is therefore prohibited from moving due to the second stop 21.

If the card 1 falls off the first stop 44, then this movement is sensed by the card sensor 19 and the output with a trailing edge from the inverter 69 is used in setting the flip flop 71. The set output Q of the flip flop 71 is applied to the AND gate 75 which also receives the logic "1" output from the output terminal $C_1$ of the decoder 67. The output of the AND gate 75 is supplied to the flip flop 73 via the OR gate 72, thereby placing the flip flop 73 into set state. As a result, the motor drive 74 permits rotation of the motor 51 again. The flip flop 73 remains in reset state and the motor 51 is disabled until the card sensor 19 in close proximity to and over the first stop 44 senses the card 1 falling. Therefore, the card 1 never fails to fall under the condition where the first stop 20 is in retracted position with regard to the travel course 18.

Upon actuation of the motor 51 the cam 45 permits the second stop 21 to divert from the travel course 18 to the actuating position $t_2$ where the perforation $h_2$ in the timing plate 52 is sensed by the timing sensor 53. After the perforation $h_2$ has been sensed, the output of the timing sensor 53 is shaped via the waveform shaping circuit 65 and the counter 66 performs counting with the leading waveform thereof. As a result, the output terminal $C_2$ of the decoder 67 provides the logic "1" output, while the remaining output terminals $C_0$, $C_1$, $C_3$, $C_4$ and $C_5$ continue providing the logic "0" output. The output from the output terminal $C_2$ is fed via the OR gate 76 to the AND gate 77. Further, the output of the waveform shaping circuit 65 is applied to the AND gate 77. The output from the AND gate 77 places the flip flop 73 into reset state, interrupting energization of the motor 51. The card 1 still remains stopped with the second stop 21. The first stop 20 enters within a range of the travel course 18, blocking up the card 1 which is sought to be inserted.

Because the cam 45 is at the actuating position $t_2$, the card 1 is stationary due to operation of the second stop 21. At this time the reset output $\overline{Q}$ is fed to the AND gate 78. The logic "1" signal from the output terminal $C_2$ is supplied via the OR gate 79 to the AND gate 78. The output of the AND gate 78 places a flip flop 80 into set state, the set output Q of which is fed to a motor drive 81 to drive the motor 61. As the motor 61 rotates, the pickup head 56 serves to scan and read the lowest entry region 4 of the card 1 when being arrested by the second stop 21, and then returns its rest position. Upon completion of this reading procedure the motor drive 81 resets the flip flop 80 and thus the motor 61 discontinues rotating. The set output of the flip flop 80 is illustrated in FIG. 10(9).

The reset output $\overline{Q}$ of the flip flop 80 is supplied to an AND gate 82 which also receives as another input the logic "1" output applied via the OR gate 79 from the output terminal $C_2$ of the decoder 67. The AND gate 82 provides its output which is to be applied via the OR gate 72 to the flip flop 73 to set the flip flop 73. The motor 51 is therefore driven to rotate the timing plate 52 and the cams 44–48. Provided that the perforation $h_3$ in the timing plate 52 is sensed by the timing sensor 53, the sensor provides its output for the counter 66 via the waveform shaping circuit 65. The second stop 21 moves out of the travel course 18, permitting the card 1 to fall and come to a stop with the help of the third stop 22.

The counter 66 performs counting in response to a pulse whose leading edge is operatively associated with the perforation $h_3$ of the timing plate 52. As a result, the logic "1" signal is derived from the output terminal $C_3$ of the decoder 67, while the logic "0" signal is derived from the remaining output terminals $C_0$, $C_1$, $C_2$, $C_4$ and $C_5$. The output from the output terminal $C_3$ is supplied via the OR gate 76 to the AND gate 77, the output of which resets the flip flop 73 and interrupts rotation of the motor 61. The reset output $\overline{Q}$ of the flip flop 73 and the signal fed via the OR gate 79 from the output terminal $C_3$ are both supplied to the AND gate 78. This permits setting of the flip flop 80, thus energizing the motor drive 81 to rotate the motor 61. The pickup head 56 is therefore capable of reading the recordings on the second lowest entry region 5 of the card 1 as arrested by the third stop 22. When reading is completed, a reading end signal is generated from the motor drive 81 to reset the flip flop 80, with the reset output $\overline{Q}$ being supplied to the AND gate 82. The AND gate 82 further receives the logic "1" signal fed via the OR gate 79 from the output terminal $C_3$. The output of the AND gate 82 sets the flip flop 73 via the OR gate 72, thus driving the motor 51 again.

Similarly, the third stop 22 retracts from the travel course 18 and the fourth stop 23 ceases movement of the card 1 so that the pickup head 56 is driven by the motor 61 for scanning. The recordings on the third lowest entry region 6 of the card are read out. Thereafter, the motor 51 is enabled again so that the fourth stop 23 diverts from the travel course 18 and the fifth stop 24 ceases movement of the card 1. The pickup head 56 is placed in an opeerative state to read the recordings on the fourth lowest entry region 7 or the highest entry region. Upon completion of this reading step the flip flop 73 is set and the motor 51 is driven again and the fifth stop 24 diverses from the travel course 18. The card 1 thus falls below off the fifth stop 26 along the travel course 18. As soon as the card 1 is sensed by the card sensor 27, the output of the card sensor 27 resets the flip flop 71 via the inverter 70. When the perforation $h_0$ in the timing plate 52 is sensed by the timing sensor 53, the output terminal $C_0$ of the decoder 67 provides the logic "1" signal, resetting the flip flop 73 and disabling the motor 51. Because of the output terminals $C_1$–$C_5$ providing the logic "0" signal, the motor 61 remains disabled and the assembly returns to its original standby state.

While the entry regions 4–7 are being scanned with the pickup head 56, the output of the pickup head 56 is supplied to a recognition circuit 84. The recognition circuit 84 performs decoding upon receipt of readouts from the pickup head 56. In the event it is difficult to perform decoding due to soiled surfaces of the entry regions 4–7 of the card 1 and misprints, the recognition circuit 84 sets a flip flop 85. The set output Q of the flip flop 85 energizes a rotary solenoid 41 via the drive 86. As a result, the separation plate 42 leads the card 1 from the travel course 18 to the stacker 15 via the guide plate 14. The display lamp 11 is fired in response to the set output Q of the flip flop 85. It is noted that the flip flop 85 may be reset upon actuation of a pushbutton 64. At this time the rotary solenoid 41 is de-energized so that the card 1 passing through the travel course 18 is directed to the stacker 12. The display lamp 11 is also extinguished upon actuation of the pushbutton 64.

The card 1 may be of a magnetic type for use with the pickup head 56 of a magnetic type and any other conventional type as an alternative embodiments of the present invention. It is further obvious that the card 1 may move due to its gravity as stated above or with the aid of a coveyor assembly comprising a pair of rollers, a belt, etc.

As noted earlier, the present invention provides the feasibility of reading the recordings on the card merely by inserting the card into the travel course, thus attaining labor savings in reading the recordings on the card. The card comes to a temporary stop through operation of the stops so that the entry regions of the card are easily but accurately readable with a simplest structure of the readout station.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A card reading assembly for reading cards having information stored thereon at locations spaced along a first dimension of said card, comprising:
    a travel path along which said cards unidirectly pass, said cards passing along said path with their first dimension parallel to the direction of said path;
    a plurality of travel stops disposed along said path to block said path and thereby interrupt movement of said cards therealong;
    means for sequentially driving said travel stops to step said card along said path; and
    reading means juxtaposed to said travel path for reading the information stored at each location on said card as said card is stepped along said path.

2. A card reading assembly as set forth in claim 1 wherein said reading means includes an optical pickup head having a light emitting element and a corresponding light receiving element.

3. A card reading assembly as set forth in claim 1 wherein said card has a plurality of said locations.

4. The card reading assembly of claim 1 further comprising:
    diverter means for diverting unsuccessfully read cards from said travel path; and
    card storage hopper means for accumulating successfully read cards at the end of said travel path.

5. The card reading assembly of claim 4 wherein said diverter means includes a rotary solenoid and separation plate.

6. The card reading assembly of claim 1 wherein said travel path is vertically disposed.

7. The card reading assembly of claim 6 wherein said travel path is disposed so that said cards are passed along said path by the force of gravity.

8. The assembly of claim 7 wherein said stops are solenoid operated.

9. The assembly of claim 7 wherein there is a travel stop for each of said locations on said card.

* * * * *